United States Patent Office 3,705,878
Patented Dec. 12, 1972

3,705,878
DYEABLE POLYESTERS CONTAINING BRANCHED ALKYL BENZENE SULFONATES
Stanley David Lazarus, Petersburg, Va., assignor to Allied Chemical Corporation, New York, N.Y.
No Drawing. Continuation-in-part of abandoned application Ser. No. 869,911, Oct. 27, 1969. This application Apr. 6, 1971, Ser. No. 131,829
Int. Cl. C08g 17/14
U.S. Cl. 260—75 S                                   16 Claims

ABSTRACT OF THE DISCLOSURE

Polyesters useful for making films and filaments having incorporated therein based upon the total amount of the dicarboxylic acid used in preparing said polyesters from about 0.006 to about 3.0 mole percent of a compound of the formula:

$$R-Z-Y-X$$

wherein:

R is a branched alkyl chain having at least 12 and not more than 30 carbon atoms,
Z is an aromatic ring selected from the group consisting of benzene, naphthalene and biphenyl,
Y is a sulfonate radical, and
X is selected from the group consisting of ammonium, sodium, zinc, calcium, chromium, potassium and magnesium for improved dye receptivity for disperse and basic dyes.

BACKGROUND OF THE INVENTION

This application is a continuation-in-part of U.S. Ser. No. 869,911 filed Oct. 27, 1969, now abandoned.

This invention relates to new linear polyethylene terephthalate polymers. More particularly it relates to new linear polyethylene terephthalate polymers containing therein an alkyl aryl sulfonate of improved dye receptivity. Still more particularly it relates to an improved process for preparing linear polyethylene terephthalate polymers suitable for use in making films and filaments. It also relates to an improved process for preparing linear polyethylene terephthalate polymers suitable for use in making films and filaments of improved dye receptivity by having incorporated therein an alkyl aryl sulfonate.

Linear polyethylene terephthalates are well known to the art and are produced either by the ester interchange reaction between dimethyl terephthalate and an alkylene glycol or the so-called direct esterification method as initially enunciated in U.S. Pat. 2,465,310 to Whinfield and Dickson and more recently in U.S. Pats. 3,024,220; 3,050,533 and 3,050,548. Although the processes for preparing the linear polyethylene terephthalates that are useful in making films and fibers have been relatively successful, many problems remain, particularly in dyeing the fiber and products made therefrom. For example, when various dye ingredients, such as phosphonates, sulfones and various low weight sulfonates are used, they adversely effect the final physical properties of the product, thus making such products unsuitable in the marketplace. Some previous efforts by those skilled in the art to overcome polyester dyeing problems are illustrated in U.S. Pats. 3,164,566; 3,164,567 and 3,164,570 and such patents. are hereby incorporated by reference. Therefore, an improved dyeable linear polyester suitable for use in preparing fibers and films and allowing greater end uses for these products as well as the process for preparing said polyester would make a substantial contribution to this art.

SUMMARY OF THE INVENTION

A primary object of this invention is to provide a new linear polyethylene terephthalate polymer suitable for use in making films and filaments. Another object of this invention is to provide a new linear polyethylene terephthalate polymer suitable for use in making films and filaments of improved dye receptivity having incorporated therein an alkyl aryl sulfonate. A further object of this invention is to provide an improved process for preparing a new linear polyethylene terephthalate polymer suitable for use in making films and filaments of improved dye receptivity. These and other objects will become apparent in the course of the following specification and claims.

In accordance with the present invention the dyeable linear polyesters of this invention are prepared essentially from an aromatic dicarboxylic acid or ester forming derivative thereof, with a diol, such as an acyclic or alicyclic aliphatic glycol, an aliphatic aromatic diol, an aromatic diol, or a diester thereof, and a small amount of a compound of the formula:

$$R-Z-Y-X$$

wherein:

R is a branched alkyl chain having at least 12 and not more than 30 carbon atoms,
Z is an aromatic ring selected from the group consisting of benzene, naphthalene and biphenyl,
Y is a sulfonate radical, and
X is selected from the group consisting of ammonium, sodium, zinc, calcium, chromium, potassium and magnesium.

A preferred class of such polyesters is prepared from terephthalic acid or an ester-forming derivative thereof and an alkylene glycol wherein the alkylene glycol is present during the reaction in amounts ranging from 1.1 to 2.0 and preferably 1.3–1.7 moles of alkylene glycol per mole of dicarboxylic acid in the presence of at least about 0.006 mole percent, based upon the acid or ester forming derivative thereof, of an alkyl aryl metal sulfonate compound of the structure:

$$R-Z-Y-X$$

wherein R is a branched alkyl chain of at least 12 and not more than 30 carbon atoms, —Z is an aromatic ring selected from the group consisting of benzene, naphthalene, and biphenyl, —Y is a sulfonate radical, and —X is selected from the group consisting of ammonium, sodium, zinc, calcium, potassium and magnesium.

The alkyl compound of the overall structure of the additive can vary considerably in distribution of chain branching. It can vary from at least 12 carbon atoms to not more than 30 carbon atoms, and, preferably from at least 19 to not more than 30 carbon atoms. Further, it can vary in molecular weight from about 150 to about 1500, but preferably from about 160 to about 750. Such parameters illustrate that the alkyl chains of the above disclosed structure are highly branched.

The aryl compound of the overall structure of this additive is selected from the group consisting of benzene, naphthalene, and biphenyl. And although other aryl compounds can be utilized, these are preferred as they yield the desired results as well as they are more readily available and more economical.

The Y of the above additive structure is a sulfonate radical group, usually in the form of a metal salt, said metal being designated as X in the overall additive structure and is selected from the group consisting of ammonium, sodium, zinc, calcium, potassium, and magnesium. The alkyl aryl sulfonic acid can not be utilized instead of the Y and X structures of the overall additive.

Unexpectedly, dye receptivity in both basic and disperse dyes of the fiber forming polyesters prepared in accordance with this invention is increased substantially, namely, up to ten fold over that of fiber forming polyesters prepared in a way other than in accordance with this invention without altering the melting point substantially or reduction in the physical properties of the polyester fiber. Further the alkyl aryl metal sulfonate is used only in a very small amount, namely, an amount of about 0.006 to about 3.0 mole percent, based upon the total amount of said dicarboxylic acid compound used in preparing the fiber forming polyester of this invention. Other unexpected advantages found to be quite useful in this invention are many.

PREFERRED EMBODIMENTS

The following examples are cited to further illustrate the invention and not to limit it. Unless specific structure is noted, the chemical constitution of all dyes referred to herein is shown as the disperse or basic dye numbered in accordance with the international Color Index (C.I.).

The disperse dyeings are carried out in a dye bath employing 1% Nacelan Scarlet CBS (C.I. disperse red 1), 0.1% Triton X–100 (an alkyl-aryl polyether alcohol base surfactant manufactured by Rohm & Haas Co.) and 0.1% tetrasodium pyrophosphate. The dyeings are carried out for 30 minutes at a temperature of 98 to 100° C. The basic or cationic dyeings are carried out in a dye bath employing percent by weight of fabric, 1.0% Sevron Brilliant Red, 2B (C.I. basic violet 16) and held 1 hour at 98° C. The liquid to goods ratio by weight is 20:1. No other stabilizers, penetrating agents or dye assistants were employed.

In the examples for which the results are recorded in Table I, the polyester fibers for either disperse or basic dyeing are first subjected to scouring with 0.5% Triton X–100 (an alkyl-aryl polyether alcohol base surfactant manufactured by Rohm & Haas Co.) and 7.0% trisodium phosphate using a 40:1 water ratio based on the total weight of fibers. The scouring is carried out for 30 minutes at 160° F. All percentages are based, unless otherwise stated, on the weight of the fabric employed. All dyeings are observed under a conventional MacBeth light using a panel jury of expert color analysts. The dye strength reported in Example II is based on the relative dye strength, disperse or basic, as compared with 100 as shown in Control Example I. Examples III through XIV are then compared to Example II as a control. The whiteness of the yarn is determined in accordance with the recommended procedure in the proceedings of the American Association of Texile Chemists and Colorists, American Dyestuff Reporter, Mar. 29, 1965, pp. 40–41.

TABLE I

| Example Number | Additive for polyester treatment | M.W. of additives | Based on DMT Weight percent | Based on DMT Mole percent | Average mol. wt. of alkyl chain | Basic dye strength [1] | M.P. of the yarn | UTS, g./d. | Tensile mod., g./d. | Percent shrinkage | OCP viscosity polymer | Yarn whiteness |
|---|---|---|---|---|---|---|---|---|---|---|---|---|
| I | None | | 0 | 0 | | 100 | 253 | 4.3 | 82 | 9.0 | 0.91 | 8 |
| II | Branched alkyl benzene sodium sulfonate. | 500 | 0.16 | 0.06 | 320≑$C_{23}H_{47}$ | 110 | 253 | 2.4 | 52 | 6.0 | 0.82 | 50 |
| III | Highly branched alkyl benzene magnesium sulfonate. | 920 | 0.405 | 0.073 | 290≑$C_{21}H_{43}$ | 200 | 253 | 2.3 | 67 | 6.0 | 0.75 | 31 |
| IV | Branched alkyl benzene ammonium sulfonate. | 465 | 0.67 | 0.28 | 290≑$C_{21}H_{43}$ | 350 | 187 | 3.5 | 80 | 1.0 | 0.37 | 10 |
| V | Branched alkyl benzene zinc sulfonate. | 956 | 0.36 | 0.07 | 290≑$C_{21}H_{43}$ | 210 | 255 | 3.5 | 75 | 6.0 | 0.87 | 85 |
| VI | Linear alkyl benzene calcium sulfonate. | 936 | 0.405 | 0.08 | 290≑$C_{21}H_{43}$ | 190 | 255 | 2.8 | 70 | 7.0 | 0.87 | 75 |
| VII | Linear alkyl benzene potassium sulfonate. | 487 | 0.4 | 0.16 | 290≑$C_{21}H_{43}$ | 200 | 252 | 2.3 | 50 | 7.5 | 0.82 | 78 |
| VIII | Highly branched alkyl benzene calcium sulfonate. | 468 | 1.1 | 0.43 | 290≑$C_{21}H_{43}$ | 400 | 231 | 2.6 | 62 | 6.5 | 0.73 | 80 |
| IX | Branched alkyl benzene sulfonic acid. | 448 | 0.5 | 0.22 | 290≑$C_{21}H_{43}$ | 350 | 187 | 2.4 | 52 | 6.0 | 0.76 | 12 |
| X | Na dodecyl naphthalene sulfonate. | 398 | 1.0 | 0.48 | 149≑$C_{12}H_{25}$ | 150 | 232 | 2.7 | 68 | 7.0 | 0.84 | 83 |
| XI | Na stearyl diphenyl sulfonate. | 508 | 1.0 | 0.38 | 149≑$C_{12}H_{25}$ | 140 | 234 | 2.3 | 53 | 7.0 | 0.82 | 75 |
| XII | Alkyl benzene sodium sulfonate. | 500 | 1.6 | 0.61 | 320≑$C_{23}H_{47}$ | 300 | 230 | 2.1 | 48 | 7.0 | 0.90 | 65 |
| XIII | Branched alkyl benzene sodium sulfonate. | 500 | 3.2 | 1.22 | 320≑$C_{23}H_{47}$ | 600 | 228 | 2.1 | 46 | 8.0 | 0.85 | 55 |
| XIV | Branched alkyl benzene sodium solfonate. | 500 | 6.4 | 2.45 | 320≑$C_{23}H_{47}$ | 1000 | 220 | 2.0 | 42 | 9.0 | 0.90 | 52 |

[1] Rated by three trained observers with respect to sample of Example I.

This invention has been illustrated particularly with respect to the use of dimethyl terephthalate and an alkylene glycol as reactants for preparing the fibers and fabrics used. The invention can be used for improved dyeing of polyesters prepared from other materials. For example, instead of using dimethyl terephthalate, terephthalic acid and naphthalene dicarboxylic acid can be used as well as aromatic dicarboxylic acids such as phthalic, isophthalic acid, phthalic anhydride and p,p' diphenyl dicarboxylic acids; cycloaliphatic dicarboxylic acids such as hexahydroterephthalic acid and aliphatic dicarboxylic acids such as succinic acid, adipic acid, sebacic acid, etc., can be used. Polyesters of glycols other than the most preferred ethylene glycol can also be used. Such glycols are the linear and alicyclic alkylene glycols having 2 to about 10 carbon atoms per molecule. The more preferred glycols, however, are the low molecular weight glycols which contain 2 to about 4 carbon atoms since they produce polyesters having high melting points. Such glycols include propylene glycol, butylene glycol, trimethylene glycol, tetramethylene glycol, decamethylene glycol, 1,4 cyclohexane dimethanol, 1,3 cyclobutane dimethanol and mixtures thereof. Further this invention can be used with copolyesters prepared from one or more of the aforementioned acids and glycols.

The disperse dyes useful in this invention may be described as water insoluble dyes which are dispersed by known techniques in water and applied as such to the textile fibers in which the dyes dissolve to give the desired coloration. A list of such dispersed dyes is given in the 1961 edition of the Technical Manual of the American Association of Textile Chemists and Colorists, vol. 37, pp. 292–293. The basic or cationic dye useful in this invention is a colored organic substance such as those containing sulfonium, oxonium, or quaternary ammonium functional groups.

Various other materials can be present in the fiber or fabrics without adversely effecting the beneficial results of this invention. Such materials can be, ester interchange and polymerization catalysts such as salts of antimony, manganese, calcium, etc. Delustrants and pigments as well as specific types of color inhibitors may also be ued.

The yarns and fabrics prepared from the polyesters of this invention are suitable for use in a great variety of textile applications. Their physical properties parallel closely those of their related polyester fibers. And, they have sensitivitiy in either disperse or basic dye applications. It is of great advantage in this invention that only a very small quantity of the additive is necessary to contribute materially to the disperse dyeability and enhance basic or cationic dyeability without adversely altering the melting point or reduction in the physical properties of the polyester fiber.

Although several specific examples of the inventive concept have been described, the invention is not to be limited thereby except as indicated in the appended claims.

EXAMPLE XV

Eighteen hundred grams terephthalic acid, 1010 grams ethylene glycol, 3.6 grams diisopropylamine, and 6.48 grams antimony tris tallate were charged to a 2 gallon autoclave equipped with a spiral type agitator. The contents were heated to 255° C. and the pressure was allowed to reach 75 p.s.i.g. after which it was maintained at 75 p.s.i.g. for 1 hour by bleeding off excess water and glycol. The pressure was then reduced to atmospheric over a 30 minute period. A nitrogen flow was maintained over the melt for 15 minutes after which the autoclave was connected to a vacuum pump. A vacuum of less than 0.1 torr and a temperature of 275° C. was established over a 1 hour period. The batch was maintained at 275° C. and about 0.1 torr for 3 hours. Then the polymer was extruded through a valve at the bottom of the autoclave into a water quench bath and pelletized using a Wiley Mill. This is a polymer A in the attached table.

A similar polymer was made in which 72 grams of sodium lauryl benzene sulfonate was added to the initial ingredients. This is polymer B in the attached table.

Another similar polymer was made in which 67.5 g. free lauryl benzene sulfonic acid was added to the initial ingredients of polymer A. This is designated polymer C in the attached table.

Polymers A, B and C were dried in a vacuum oven at 150° C. for 16 hours and spun on a one inch extruder. It was found that polymer C would not feed properly, and the extrusion and spin block temperatures had to be lowered from 300 to 290° C. Polymers A and B were drawn at a draw ratio of 4.0 to 1 into 70 denier, 16 filament yarn. However, sample C could not be drawn without breaking. The IV and COOH of the free fall yarn is given in the attached table.

EXAMPLE XVI

Four pounds of a commercial polyester having an intrinsic viscosity of 0.71 were dried and spun as in Example XV. This polymer is designated D in the attached table.

Four pounds of this commercial polyester were coated from aqueous solution with 4.02% of sodium lauryl benzene sulfonate, dried and spun as in Example XV. This is designated E in the attached table.

Four pounds of the commercial polyester were coated with 3.76% free lauryl benzene sulfonic acid to obtain polymer F, having the same sulfur content as polymer E. Polymer F would not feed consistently into the spinning extruder. Once more, polymer F made with the free sulfonic acid would not draw without breaking while the polymer containing the sodium salt of the alkyl benzene sulfonic acid drew very well. Drawing temperatures of 105 to 170° C. were tried unsuccesfully to draw sample F. Free fall yarn IV and COOH end group results are given in the table.

Yarns B and E containing sodium lauryl benzene sulfonate and their respective controls A and D which did not contain this additive were knitted into sleeves and dyed with Duranol Blue G (Imperial Chemicals Industries—Disperse Blue 26) at the trial using Carolid NF (Tanotex Chemical Co.) as a carrier. No significant difference in the dyeability of the four samples was observed.

The same yarns were cationically dyed with Nabor Blue B (Allied Chemical Co.—Basic Blue 21) using Carolid ELFC carrier (Tanotex Chemical Co.).

Sample B was observed to dye to a much greater extent than samples A, D or E. This is particularly surprising in the case of sample B vs. E, both of which contained the same percentage of the same dye accepting additive. The attached table gives optical density values at 575 mm. for solutions of 0.5 g. yarn in 25 ml. of a mixed solvent consisting of 60% phenol and 40% tetrachloroethane. Microscopic examination of sample E (which did not dye well cationically) showed that the additive was present as globules within the fiber. Thus the availability of dye sites was much less than in fiber B in which the additive was well dispersed. This indicates that the method of addition of the metal alkyl benzene sulfonate is critical. The optimum results observed are obtained when the additive is put into the initial reaction mixture prior to esterification.

TABLE II.—PROPERTIES OF CATIONIC DYEABLE AND CONTROL POLYMERS AND YARNS

| | | Polymer | | | Yarn | | |
|---|---|---|---|---|---|---|---|
| | | | | | Free fall | | Drawn-dyed yarn optical density [2] |
| Ex. | Designation | IV | COOH | M.P.[1] | IV | COOH | |
| XV | A | 0.72 | 51 | 254 | 0.64 | 56 | 0.219 |
| XV | B | 0.70 | 49 | 246 | 0.61 | 56 | 0.676 |
| XV | C | 0.52 | 92 | 246 | 0.46 | 98 | [3] |
| XVI | D | 0.71 | | | 0.62 | 30 | 0.210 |
| XVI | E | 0.71 | | | 0.63 | 30 | 0.224 |
| XVI | F | 0.71 | | | 0.61 | 32 | [3] |

[1] Determined on Differential Thermal Analyzer. (Optical melting points run about 8° C. higher than those determined by this DTA method.)
[2] Determined at 575 mm. on solution of 0.5 g. of yarn in 25 ml. of a solvent consisting of 60% phenol and 40% tetrachloroethane.
[3] Could not obtain yarn.

NOTE.—Example XV shows that free sulfonic acid prevents polymerizing to a sufficiently high molecular weight to obtain a useful fiber while this can be done with a sulfonate salt; Example XVI shows that the free sulfonic acid coated onto polyester chips causes them to stick so that the spinning extruder cannot be fed consistently. No such problem is encountered in spinning chips coated with the sulfonate salt.

I claim:
1. A cationic dyeable linear high molecular weight fiber and film forming polyester consisting essentially of the condensation product of (a) a dicarboxylic acid compound selected from the group consisting of aromatic dicarboxylic acid and the dialkyl ester thereof; (b) an aliphatic glycol containing from 2 to 10 carbon atoms; and, based upon the total amount of said dicarboxylic acid compound, (c) from about 0.006 to about 3.0 mole percent of a compound of the structure:

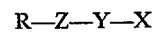

wherein:
R is a branched alkyl chain having at least 12 and not more than 30 carbon atoms,
—Z is an aromatic ring selected from the group consisting of benzene, naphthalene and biphenyl,
—Y is a sulfonate radical, and
—X is selected from the group consisting of ammonium, sodium, zinc, calcium, chromium, potassium, and magnesium.
2. The polyester of claim 1 wherein the aromatic dicarboxylic acid is terephthalic acid.
3. The polyester of claim 1 wherein the aliphatic glycol is ethylene glycol.
4. The polyester of claim 1 wherein the aromatic dicarboxylic acid is terephthalic acid and the aliphatic glycol is ethylene glycol.
5. The polyester of claim 4 wherein R is a branched alkyl chain having 21 carbon atoms, Z is benzene, and X is selected from the group consisting of ammonium, sodium, zinc, calcium, potassium and magnesium.
6. The process of preparing high molecular weight fiber and film forming polyester which have improved cationic dyeability which comprises esterifying a dicarboxylic acid compound selected from the group consisting of aromatic dicarboxylic acid and the dialkyl ester thereof with an aliphatic glycol as defined in claim 1, and based upon the total amount of said dicarboxylic acid compound, adding thereto from about 0.006 to about 3.0 mole percent of a compound of the structure:

R—Z—Y—X wherein:
R is a branched alkyl chain having at least 12 and not more than 30 carbon atoms,
—Z is an aromatic ring selected from the group consisting of benzene, naphthalene and biphenyl,
—Y is a sulfonate radical, and
—X is selected from the group consisting of ammonium, sodium, zinc, calcium, chromium, potassium, and magnesium.

7. The process of claim 6 wherein the aromatic dicarboxylic acid is terephthalic acid.

8. The process of claim 6 wherein the aliphatic glycol is ethylene glycol.

9. The process of claim 6 wherein the aromatic dicarboxylic acid is terephthalic acid and the aliphatic glycol is ethylene glycol.

10. The process of claim 9 wherein R is a branched alkyl chain having 21 carbon atoms, Z is benzene and X is selected from the group consisting of ammonium, sodium, zinc, calcium, potassium and magnesium.

11. A filament made from a linear high molecular weight fiber and film forming polyester of a glycol and a terephthalic acid having added thereto from about 0.006 to about 3.0 mole percent based upon the total amount of said acid of a compound of the structure:

R—Z—Y—X wherein:
R is a branched alkyl chain having at least 12 and not more than 30 carbon atoms,
—Z is an aromatic ring selected from the group consisting of benzene, naphthalene and biphenyl,
—Y is a sulfonate radical, and
—X is selected from the group consisting of ammonium, sodium, zinc, calcium, chromium, potassium, and magnesium.

12. The filament of claim 11 which has been dyed with a cationic dye.

13. The polyester of claim 4 wherein R is a branched alkyl chain having 12 carbon atoms, Z is naphthalene, and X is selected from the group consisting of ammonium, sodium, zinc, calcium, potassium and magnesium.

14. The polyester of claim 13 wherein X is sodium.

15. The polyester of claim 4 wherein R is a branched alkyl chain having 12 carbon atoms, Z is biphenyl and X is selected from the group consisting of ammonium, sodium, zinc, calcium, potassium and magnesium.

16. The polyester of claim 15 wherein X is sodium.

References Cited
UNITED STATES PATENTS 3,310,532    3/1967    Kazama et al. _____ 260—75

WILLIAM H. SHORT, Primary Examiner

L. L. LEE, Assistant Examiner

U.S. Cl. X.R.

8—179; 260—40 R